(12) United States Patent
van Lengerich et al.

(10) Patent No.: US 7,803,413 B2
(45) Date of Patent: *Sep. 28, 2010

(54) ENCAPSULATION OF READILY OXIDIZABLE COMPONENTS

(75) Inventors: Bernhard H. van Lengerich, Plymouth, MN (US); Goeran Walther, Plymouth, MN (US); Benjamin van Auken, Minneapolis, MN (US)

(73) Assignee: General Mills IP Holdings II, LLC., Minneapolis, MN (US)

( * ) Notice: Subject to any disclaimer, the term of this patent is extended or adjusted under 35 U.S.C. 154(b) by 1152 days.

This patent is subject to a terminal disclaimer.

(21) Appl. No.: 11/263,360

(22) Filed: Oct. 31, 2005

(65) Prior Publication Data

US 2007/0098853 A1 May 3, 2007

(51) Int. Cl.
*A23L 1/00* (2006.01)

(52) U.S. Cl. .............. 426/89; 426/98; 264/4; 264/4.3

(58) Field of Classification Search ............ 426/89, 426/98, 99; 264/4, 4.3; 428/402.2; 427/213.3, 427/213.31; 424/489, 490
See application file for complete search history.

(56) References Cited

U.S. PATENT DOCUMENTS

| | | |
|---|---|---|
| 2,876,160 A | 3/1959 | Spencer et al. |
| 3,027,102 A | 3/1962 | Lödige et al. |
| 3,404,984 A | 10/1968 | Olsen |
| 3,762,931 A | 10/1973 | Craig et al. |
| 3,786,123 A | 1/1974 | Katzen |
| 3,868,471 A | 2/1975 | Decelles et al. |
| 3,922,354 A | 11/1975 | Galluzzi et al. |
| 3,925,343 A | 12/1975 | Hampton et al. |
| 3,928,567 A | 12/1975 | Andersen et al. |
| 3,962,416 A | 6/1976 | Katzen |
| 3,992,555 A | 11/1976 | Kovacs |
| 4,075,356 A | 2/1978 | Haag et al. |
| 4,106,991 A | 8/1978 | Markussen et al. |
| 4,178,392 A | 12/1979 | Gobble et al. |
| 4,187,321 A | 2/1980 | Mutai et al. |
| 4,242,219 A | 12/1980 | Bogerman et al. |
| 4,357,358 A | 11/1982 | Schanze |
| 4,379,171 A | 4/1983 | Furda et al. |
| 4,386,106 A | 5/1983 | Merritt et al. |
| 4,532,145 A | 7/1985 | Saleeb et al. |
| 4,689,235 A | 8/1987 | Barnes et al. |
| 4,816,259 A | 3/1989 | Matthews et al. |
| 4,820,534 A | 4/1989 | Saleeb et al. |
| 4,871,574 A | 10/1989 | Yamazaki et al. |
| 4,886,820 A | 12/1989 | Gross et al. |
| 4,888,171 A | 12/1989 | Okonogi et al. |
| 4,895,725 A | 1/1990 | Kantor et al. |
| 4,938,967 A | 7/1990 | Newton et al. |
| 4,999,208 A | 3/1991 | van Lengerich et al. |
| 5,009,900 A | 4/1991 | Levine et al. |
| 5,023,083 A | 6/1991 | Drell |
| 5,064,669 A | 11/1991 | Tan et al. |
| 5,071,668 A | 12/1991 | van Lengerich et al. |
| 5,074,902 A | 12/1991 | Connick, Jr. et al. |
| 5,075,058 A | 12/1991 | Chan et al. |
| 5,079,012 A | 1/1992 | van Lengerich et al. |
| 5,087,461 A | 2/1992 | Levine et al. |
| 5,106,639 A | 4/1992 | Lee et al. |
| 5,118,513 A | 6/1992 | Mehansho et al. |
| 5,183,690 A | 2/1993 | Carr et al. |
| 5,262,167 A | 11/1993 | Vegesna et al. |
| 5,296,000 A | 3/1994 | Darmont et al. |
| 5,314,692 A | 5/1994 | Haarasilta et al. |
| 5,320,669 A | 6/1994 | Lim et al. |
| 5,397,834 A | 3/1995 | Jane et al. |
| 5,431,929 A | 7/1995 | Yatka et al. |

(Continued)

FOREIGN PATENT DOCUMENTS

| | | |
|---|---|---|
| DE | 37 38 042 A | 5/1988 |
| DE | 40 21 678 A | 1/1992 |
| DE | 40 41 752 A1 | 6/1992 |
| EP | 0 336 662 A | 10/1969 |
| EP | 0 202 409 A2 | 11/1986 |

(Continued)

OTHER PUBLICATIONS

U.S. Appl. No. 11/500,545, filed Aug. 8, 2006, van Lengerich et al.
"Starch's many variants", by Meattech, *Food Engineering and Ingredients*, pp. 58-60 (May 2006).
Kempf, "Process for the Industrial Production of wheat Starch From Whole Wheat", *Wheat Is Unique*, Washington State University, Pullman, WA, pp. 521-540.

(Continued)

*Primary Examiner*—Drew E Becker
*Assistant Examiner*—Preston Smith
(74) *Attorney, Agent, or Firm*—Douglas J. Taylor; Arlene L. Hornilla; Barry I. Hollander

(57) ABSTRACT

A stabilized emulsion is employed to produce shelf stable, controlled release, discrete, solid particles or pellets which contain an encapsulated and/or embedded component, such as a readily oxidizable component, such as omega-3 fatty acids. An oil encapsulant component which contains an active, sensitive encapsulant, dissolved and/or dispersed in an oil is admixed with an aqueous component and a film-forming component, such as a protein, to form an emulsion. The emulsion is admixed with a matrix material for obtaining a formable mixture or dough. An acidic antioxidant for prevention of oxidation of the active, sensitive encapsulant, and a plasticizer which solubilizes the acidic antioxidant are included in the matrix material which encapsulates film-coated oil droplets containing the readily oxidizable component. The plasticizer, such as glycerol, provides mobility for the acidic antioxidant within the matrix material of the pellets for reaction with any ambient oxygen and malodorous amines.

19 Claims, No Drawings

U.S. PATENT DOCUMENTS

| | | | |
|---|---|---|---|
| 5,458,823 | A | 10/1995 | Perkins et al. |
| 5,466,460 | A | 11/1995 | McMahon et al. |
| 5,508,053 | A | 4/1996 | Villota et al. |
| 5,514,387 | A | 5/1996 | Zimmerman et al. |
| 5,567,730 | A | 10/1996 | Miyashita et al. |
| 5,597,416 | A | 1/1997 | Fuisz et al. |
| 5,683,720 | A | 11/1997 | Myers et al. |
| 5,716,615 | A | 2/1998 | Vesely et al. |
| 5,744,180 | A | 4/1998 | Cherukuri et al. |
| 5,750,104 | A | 5/1998 | Sipos |
| 5,804,208 | A | 9/1998 | Andersch et al. |
| 5,820,903 | A | 10/1998 | Fleury et al. |
| 5,851,553 | A | 12/1998 | Myers et al. |
| 5,862,998 | A | 1/1999 | Bogue et al. |
| 5,894,029 | A | 4/1999 | Brown et al. |
| 5,902,617 | A | 5/1999 | Pabst |
| 5,939,127 | A | 8/1999 | Abboud |
| 5,952,033 | A | 9/1999 | Anantharaman et al. |
| 5,958,502 | A | 9/1999 | Fulger et al. |
| 5,972,373 | A | 10/1999 | Yajima et al. |
| 5,972,395 | A | 10/1999 | Saleeb et al. |
| 5,972,404 | A | 10/1999 | van Lengerich |
| 5,972,415 | A | 10/1999 | Brassart et al. |
| 5,976,603 | A | 11/1999 | Kota et al. |
| 6,004,594 | A | 12/1999 | van Lengerich |
| 6,008,027 | A | 12/1999 | Langner |
| 6,011,092 | A | 1/2000 | Seppala et al. |
| 6,024,994 | A | 2/2000 | Jacobson et al. |
| 6,048,551 | A | 4/2000 | Hilfinger et al. |
| 6,149,965 | A | 11/2000 | van Lengerich et al. |
| 6,168,811 | B1 | 1/2001 | Clark et al. |
| 6,174,553 | B1 | 1/2001 | Cerda et al. |
| 6,190,591 | B1 | 2/2001 | van Lengerich |
| 6,242,033 | B1 | 6/2001 | Sander |
| 6,261,613 | B1 | 7/2001 | Narayanaswamy et al. |
| 6,284,268 | B1 | 9/2001 | Mishra et al. |
| 6,290,990 | B1 | 9/2001 | Grabowski et al. |
| 6,342,257 | B1 | 1/2002 | Jacobson et al. |
| 6,368,621 | B1 | 4/2002 | Engel et al. |
| 6,436,453 | B1 | 8/2002 | van Lengerich et al. |
| 6,468,568 | B1 | 10/2002 | Leusner et al. |
| 6,500,463 | B1 * | 12/2002 | van Lengerich ............ 424/499 |
| 6,503,546 | B1 * | 1/2003 | Ferrari-Philippe et al. .... 426/94 |
| 6,558,718 | B1 | 5/2003 | Evenson et al. |
| 6,720,001 | B2 | 4/2004 | Chen et al. |
| 6,723,358 | B1 * | 4/2004 | van Lengerich ............. 426/94 |
| 6,837,682 | B2 | 1/2005 | Evenson et al. |
| 7,431,986 | B2 | 10/2008 | Van Lengerich et al. |
| 2001/0008635 | A1 | 7/2001 | Quellet et al. |
| 2001/0044026 | A1 | 11/2001 | Vaghefi et al. |
| 2002/0044968 | A1 * | 4/2002 | van Lengerich ............. 424/469 |
| 2004/0017017 | A1 * | 1/2004 | Van Lengerich et al. ....... 264/4 |

FOREIGN PATENT DOCUMENTS

| | | |
|---|---|---|
| EP | 0 223 963 A | 6/1987 |
| EP | 0 347 014 A1 | 12/1989 |
| EP | 2 640 472 A | 6/1990 |
| EP | 0 385 081 A2 | 9/1990 |
| EP | 0 391 518 A | 10/1990 |
| EP | 0404727 A2 | 12/1990 |
| EP | 0 462 012 A2 | 12/1991 |
| EP | 0 465 364 A1 | 1/1992 |
| EP | 0 552 057 A | 7/1993 |
| EP | 0 603 992 A1 | 6/1994 |
| EP | 0 605 913 A1 | 7/1994 |
| EP | 0 705 541 A1 | 4/1996 |
| EP | 2 758 055 | 7/1998 |
| EP | 1 064 856 A2 | 1/2001 |
| EP | 1 066 761 A2 | 1/2001 |
| EP | 1 118 274 A | 7/2001 |
| GB | 15312 | 3/1911 |
| GB | 1 437 501 A | 5/1976 |
| JP | 47014316 A | 10/1972 |
| JP | 59139317 A | 8/1984 |
| JP | 60-75226 | 4/1985 |
| JP | 63 173568 | 7/1988 |
| JP | 1313421 A | 12/1989 |
| JP | 6024962 A | 2/1994 |
| JP | 2000139372 A | 5/2000 |
| RU | 2 071 765 C1 | 1/1997 |
| WO | WO 85/04074 A1 | 9/1985 |
| WO | WO 88/01512 A | 3/1988 |
| WO | WO 90/15537 | 12/1990 |
| WO | WO 91/03940 A1 | 4/1991 |
| WO | WO 92/00130 A1 | 1/1992 |
| WO | WO 92/00140 A1 | 1/1992 |
| WO | WO 92/12645 A1 | 8/1992 |
| WO | WO 94/01001 | 1/1994 |
| WO | WO 94/23593 A1 | 10/1994 |
| WO | WO 95/00121 A1 | 1/1995 |
| WO | WO 95/18544 A1 | 7/1995 |
| WO | WO 95/26752 A1 | 10/1995 |
| WO | WO 96/09773 A1 | 4/1996 |
| WO | WO 96/14058 A1 | 5/1996 |
| WO | WO 97/16076 A1 | 5/1997 |
| WO | WO 97/38016 A1 | 10/1997 |
| WO | WO 97/39116 A1 | 10/1997 |
| WO | WO 98/02148 A | 1/1998 |
| WO | WO 98/09981 A | 1/1998 |
| WO | WO 98/18610 A1 | 5/1998 |
| WO | WO 98/35704 A | 8/1998 |
| WO | WO 98/50019 A | 11/1998 |
| WO | WO 98/54980 A2 | 12/1998 |
| WO | WO 98/58642 A | 12/1998 |
| WO | WO 99/11242 A1 | 3/1999 |
| WO | WO 99/20745 A1 | 4/1999 |
| WO | WO 99/23896 A | 5/1999 |
| WO | WO 99/34688 A1 | 7/1999 |
| WO | WO 99/45904 A1 | 9/1999 |
| WO | WO 99/48372 A1 | 9/1999 |
| WO | WO 99/56563 A2 | 11/1999 |
| WO | WO 99/61002 A1 | 12/1999 |
| WO | WO 99/65336 A1 | 12/1999 |
| WO | WO 00/21504 A1 | 4/2000 |
| WO | WO 00/41740 A2 | 7/2000 |
| WO | WO 00/64436 A1 | 11/2000 |
| WO | WO 01/25414 A1 | 4/2001 |
| WO | WO 01/74175 A1 | 10/2001 |

OTHER PUBLICATIONS

Cornell et al., "The Wet Milling of Wheat Flour", *Wheat Chemistry and Utilization*, pp. 79-125.

Johnson et al., "Wet Milling: The Basis for Corn Biorefineries", *Corn: Chemistry and Technology*, Second Edition, Am. Assn. of Cereal Chemists, Inc., St. Paul, MN, pp. 449-494.

Leach, "Gelatinization of Starch", *Starch: Chemistry and Technology*, vol. I, Academic Press, 1965, pp. 289-307.

Whistler et al., "Starch", *Carbohydrate Chemistry for Food Scientists*, Eagan Press, St. Paul, MN, pp. 117-151.

U.S. Appl. No. 09/233,443, filed Jan. 20, 1999, van Lengerich.

Per Artusson et al., "Characterization of Polyacryl Starch Microparticles as Carriers for Proteins and Drugs," *Journal of Pharmaceutical Science*, vol. 73, No. 11, pp. 1507-1513 (Nov. 1984).

Lennart Randen et al., "Coprecipitation of Enzymes with Water Soluble Starch—An Alternative to Freeze-drying," *J. Pharm. Pharmacol.*, vol. 40, pp. 763-766 (1988).

Shigeaki Maruo et al., "Effects of Moranoline, 4-O-α-D-Glucopyranosylmoranoline and Their N-Substituted Derivatives on Thermostability of Cyclodextrin Glycosyltransferase, Glucoamylase, and β-Amylase," *Biosci. Biotech. Biochem.*, vol. 57, No. 8, pp. 1294-1298 (1993).

Wendell Q. Sun et al., "Protein stability in the amophous carbohydrate matrix: relevance to anhydrobiosis," *Biochimica et Biophysica Acta*, vol. 1425, pp. 245-254 (1998).

Brochure entitled "Innovate With Raftiline®," Orafti Active Food Ingredients, Nov. 1996.

"Inulin-A 'Good-for-you' Fat Replacer, Texture Modifier," *Food Formulating*, p. 15, Feb. 1997.

Brighenti, F., et al., "One Month Consumption of Ready-to-eat Breakfast Cereal Containing Inulin Markedly Lowers Sersum Lipids in Normolipidemic Men," from: Proceedings of 7th FENS European Nutrition Conference, Vienna, 1995.

Silva, R., "Use of Inulin as a Natural Texture Modifier," *Cereal Foods World*, Oct. 1996, vol. 41, No. 10, pp. 792-794.

Niness, "Breakfast Foods and the Health Benefits Of Inulin and Oligofructose," *Cereal Foods World*, vol. 44, No. 2, Feb. 1999, pp. 79-81.

*Webster's New Collegiate Dictionary*, 1976 ed., pp. 408 ("extrude"), 511 ("gum"), 716 ("melt"), 741 ("molten") and 1095 ("slurry").

P. Colonna et al., "Extrusion Cooking of Starch & Starch Products," Extrusion Cooking, pp. 247-319, Aacc, St. Paul, Mn (1989).

F. Meuser et al., "A Systems Analytical Approach to Extrusion," Food Extrusion Science & Technology, ed. J. Kokini, Dekker Publ., pp. 619-630 (1992).

Arshady R., "Microcapsules for Food", *Journal of Microencapsulation*, vol. 10, No. 4, pp. 413-435, Oct. 1, 1993, Taylor and Francis Inc., London, GB.

The Scots Kitchen, Abemethy biscuits recipe from the web site www.scotweb.com.uk/kitchen/BAK/abemethy.html , based upon "A Taste of Old Scotland" by Micheil Rob Mack Phadruig, last updated May 24, 1999.

Hermann, "Specialty Dairy Ingredients", Food Product Design, Feb. 1992.

\* cited by examiner

US 7,803,413 B2

ENCAPSULATION OF READILY OXIDIZABLE COMPONENTS

FIELD OF THE INVENTION

The present invention relates to a continuous process for producing shelf-stable, discrete, solid particles which contain an encapsulated and/or embedded component such as a heat sensitive or readily oxidizable pharmaceutically, biologically, or nutritionally active polyunsaturated fatty acid, such as omega-3 fatty acids.

BACKGROUND OF THE INVENTION

In encapsulating a component in a matrix, the matrix material is generally heated to a sufficiently high temperature to provide a plasticized mass which facilitates embedding or coating of the component. Upon cooling, the matrix material hardens or becomes solidified and protects the encapsulant from undesirable or premature reaction. Grinding of a solidified or glassy product to obtain a desired particle size for incorporation in foods or beverages generally results in the formation of irregularly-shaped pieces and rough surfaces. Irregularly shaped pieces and creviced surfaces tend to result in non-uniform encapsulant release, increased diffusion of liquid encapsulants, and increased penetration of oxygen and water which may deleteriously affect sensitive encapsulants, such as readily oxidizable components. Incorporation of a water soluble antioxidant, such as an acidic antioxidant into a dry matrix material may not be effective for preventing oxidation because of the substantial absence of a fluid reaction medium for the antioxidant or immobilization of the antioxidant. Increasing the water content of the matrix material to improve antioxidant mobilization may result in a water activity which is not shelf stable, may adversely affect a desirable crispy texture, or may adversely affect the release properties of the matrix.

Prophylactic and therapeutic benefits of omega-3 fatty acids and their role as anti-inflammatory agents are well-proven. Recent clinical studies have further suggested that consumption of sufficient amounts of these polyunsaturated fatty acids may be adequate for intervention treatment for animals and humans suffering from rheumatoid arthritis. Dietary sources of omega-3 fatty acids can be found mainly in foods from marine sources such as algae and fish. In most populations, however, the nutritional benefits of polyunsaturated fatty acid (PUFA) compounds cannot be realized due to the low consumption of fish and edible algae. With the U.S. Food and Drug Administration's current allowance for health claims relating to intake of omega-3 fatty acids for protection from heart disease, there is an increased interest in fortifying food products with these components. One main problem that hinders the incorporation of omega-3 PUFA oils into processed foods is the oil's high degree of unsaturation, its susceptibility to oxidation and the subsequent deteriorative effects on flavor and aroma of the oil.

The stabilization of omega-3 fatty acid compounds is disclosed in U.S. Pat. No. 5,567,730 to Miyashita et al. One or more of the compounds or an oil or fat containing the compounds is dispersed in an aqueous solution optionally using a surface active agent or an emulsifying agent, such as Tween 20, a sucrose fatty ester, a sorbitan fatty ester, lecithin and a monoglyceride. A water soluble or oil soluble anti-oxidizing agent or a clathrate inclusion compound such as cyclodextrin can be used together with the surface active agent or emulsifying agent. When no surface active agent or emulsifying agent is used, the amount of the omega-3 fatty acid to added to the aqueous system to allow the stabilization is 0.0001-0.3 (w/v)%. When the agent is employed the amount of the omega-3 fatty acid to be added to the aqueous system to allow the stabilization is still only 0.0001-7 (w/v)%. Production of shelf-stable, discrete, solid particles which contain omega-3 fatty acids or fish oils is not disclosed.

International patent publication no. WO 95/26752 (published Oct. 12, 1995) discloses the production of a food product for the enteric supply of a fatty acid, a fatty acid containing substance, an amino acid, or an amino acid containing substance by at least partially complexing the fatty acid or amino acid in the amylose helix of starch to mask the acid. The product may contain one or more flavors and colors, fat soluble substances, anti-oxidants, or pharmacologically effective substances. The components may be first dry mixed and subsequently fed into an extruder where they are substantially mixed and subsequently heated above the gelatinization temperature of the starch to obtain an elasticized mass which is extruded and formed into pellets. However, heat-sensitive components would be destroyed during the heating step.

U.S. Pat. No. 4,895,725 to Kantor et al discloses the microencapsulation of oil-based bioactive materials, such as fish oil which contain polyunsaturated fatty acids. The microcapsules are prepared from an emulsion of fish oil and an enteric coating suspended in a basic solution, preferably a 25% suspension of ethyl cellulose in ammonium hydroxide. The emulsion is atomized into an acidic solution using an inert gas such as nitrogen or argon. The resulting microcapsules are filtered out of the acidic solution, washed with water and a surfactant and dried. The conditions under which the emulsion is atomized determines the particle size, which can range from about 0.1 to 500 microns, preferably between about 0.5 to 100 microns. However, the enteric coating, such as ethylcellulose is not solubilized and the resulting suspension requires atomization into an acidic aqueous solution to produce microcapsules. Filtering and several washing steps are needed to recover the microcapsules. Control of oil droplet sizes by homogenization so as to avoid coalescence and obtain a substantially uniform oil droplet size is not disclosed. Protection or prevention of the microcapsules from cracking, or rupturing is not taught. Also, prevention or inhibition of diffusion of the oil through the capsule wall to the microcapsule surface, and penetration of oxygen through the capsule wall into the oil are not disclosed.

The production of expanded products is disclosed in European patent publication nos. EP 0465364 A1 (published Jan. 8, 1992) and EP 0462012 A2 (published Dec. 18, 1991), U.S. Pat. No. 3,962,416 to Katzen and U.S. Pat. No. 3,786,123 to Katzen. The two European patent publications disclose the production of an anti-obesity food and a method for making it by extrusion of starches with fatty acids into an expanded product having densities between 0.1 and 0.3 g/cm$^3$. U.S. Pat. No. 3,962,416 to Katzen discloses an expanded product which contains at least one nutrient and one gelatinized starch.

U.S. Pat. No. 3,786,123 to Katzen discloses a method for producing encapsulated nutrients using extrusion temperatures of between 250° F. and 400° F. and extrusion pressures of between 200 psi to 2500 psi. A high protein encapsulating agent containing up to 40% starch may be used. The starch is gelatinized and extruded into an expanded product.

However, in producing a product having controlled release or delayed release, excessive expansion or puffing may result in too rapid release properties or may undesirably expose an encapsulant to destructive reactions. For example, in the case of an edible composition for delivering encapsulated pharmaceutically or nutritionally active components or a non-edible agricultural product for delivering biocides or herbicides, it is desirable that the products have a substantially spherical shape and a high density. Such products exhibit a substantially low ratio between surface area and volume and thus minimize or prevent surface related destructive reactions that occur upon exposure to air or oxygen and light. The spherical shapes and high densities also minimize the surface which would be available to expose embedded material which is not encapsulated. Furthermore, for edible products for delivering pharmaceutically or nutritionally active components, it is desirable that the products are capable of being consumed or swallowed without chewing or substantially no chewing. Avoiding the need for mastication, further assures that the products reach the digestive tract without substantial enzymatic hydrolysis in the mouth. Furthermore, it helps to control or reduce dissolution of the product in gastric juice and to control the release of the embedded or encapsulated components in the stomach and/or in the intestine.

International patent publication no. WO 92/00130 (published Jan. 9, 1992) discloses a continuous process for obtaining an encapsulated, biologically active product in a starchy matrix. A biologically active agent and starch are mixed before extrusion and extruded as a blend, with the encapsulant or biologically active agent being heated together with the starch. Alternatively, a core material to be encapsulated may be added and blended with an aqueous dispersion of starch after the starch and water have been subjected to an elevated temperature sufficient to gelatinize the starch. The extrusion process, it is disclosed, exposes the mix to high shear mechanical action at a temperature above the gelatinization temperature of the starch. The use of extrusion barrel temperatures of between about 58° C. and 98° C. are disclosed. While these barrel temperatures may be above the gelatinization temperature of starch, the extruder utilized has barrel sections that are only three l/d long. The screw speeds utilized, between 400 rpm and 200 rpm, result in a very short residence time of the blend inside the extruder and barely allow heating up of the starch water mix. As a result, the temperatures obtained are generally too low to obtain substantial gelatinization of native starches. Additionally, the barrel temperatures used are particularly too low for substantial gelatinization of high amylose starch which generally gelatinizes at temperatures substantially above 100° C., for example at 125° C. The use of extrusion barrel temperatures which are not sufficiently high to substantially or completely gelatinize the starch may not form a sufficiently continuous, plasticized and homogeneous matrix for effective embedding or encapsulation.

In addition, the use of relatively low extrusion temperatures, high speed mixing, and a high viscosity starch composition generally requires a high mechanical energy input. High shear is directly related to high specific mechanical energy, which in turn increases the molecular destructurization and dextrinization of starch. Breakdown of the starch molecules, and in particular the amylopectin, increases the solubility of the extruded starch composition in aqueous systems as described in P. Colonna, et al., "Extrusion Cooking of Starch & Starchy Products," *Extrusion Cooking*, C. Mercier, et al. pp. 247-319, AACC, St. Paul, Minn. (1989) and F. Meuser, et al, "A Systems Analytical Approach To Extrusion," *Food Extrusion Science & Technology*, ed. J. Kokini, Dekker Publ., pp. 619-630 (1992). Increased solubility of the extruded starch in aqueous systems decreases the stability of the product against moisture and subsequently diminishes or shortens the protection and controlled release of the embedded or encapsulated substances. In addition, subjecting the encapsulant to the same high shear and high temperature conditions to which the starch is subjected may adversely affect the encapsulant by at least partially destroying it or decomposing it into unknown solid or volatile substances.

Pregelatinized starch is used in numerous applications in the food industry as a swelling agent and for accelerated and extended water absorption in foods such as soups, sauces, instant puddings, baby food, and thickening agents. However, it has been found that the use of pregelatinized starch or the use of starch as the only matrix material during extrusion cooking generally results in a matrix which releases the encapsulant too quickly. It has been found that the penetration of water into a pure starch matrix causes early release of the encapsulant into the environment. Generally the time to release 100% of the encapsulant is too short to provide a desirable time-release or controlled-release which is effective for delivering the encapsulant at a desired location or time.

U.S. Pat. No. 5,183,690 to Carr, et al. discloses a continuous process for imparting predetermined release properties to an encapsulated biologically active agent in a matrix of starchy material. The starchy material, an active agent, and water are continuously blended in an ingredient stream wherein the starchy material is at a solids concentration of at least 40%. The ingredients stream is continuously extruded as an extrudate and the extrudate is continuously recovered. The conditions of blending, extruding, and recovering are preselected to yield the predetermined release properties. The temperature is elevated to at least about 65° C. to effect gelatinization of starch and assure an essentially molecular dispersion of the starch in the water. Alternatively, the core material to be encapsulated is added and blended with the aqueous dispersion of starch after the starch and water has been subjected to an elevated temperature sufficient to gelatinize the starch. In this embodiment the aqueous starch stream containing gelatinized starch may be lowered to a temperature as low as about 25° C. before the core material to be encapsulated is added and subjected to high-shear mechanical action. Under such low temperature conditions of admixture it is disclosed, the activity of sensitive biological material, such as bacteria and viruses, is preserved and loss of volatile organic materials is minimized. The rate of swelling of the products in water and the rate of release of active agents are controlled by altering the amount of water present in the starch-agent-water blend during processing. As the amount of water is decreased, both the swelling rate and the release rate increase. The rate of swelling of the products in water and the rate of release of active agent are also controlled by passage of the extrudate containing starch-agent-water through an exit die of various dimensions. As the exit die is reduced in size, both the rate and extent of swelling increase and the rate of release of agent increases.

U.S. Pat. No. 6,190,591 and International Publication No. WO 98/18610, published on May 7, 1998, both to Bernhard H. van Lengerich, the disclosures of which are herein incorporated by reference in their entireties, disclose a controlled release particulate composition which contains a hydrophobic component for controlling the release of an encapsulated and/or embedded active component from a plasticized matrix. High water binding capacity agents may also be used to delay or control the release of the encapsulant from the matrix. A high amount of plasticizer is employed to facilitate plasticization of the matrix material at low shear and is then reduced prior to adding the encapsulant to facilitate subsequent forming and to reduce post extrusion drying. Liquid active components or solutions, dispersions, emulsions or suspensions may be injected into the plasticized matrix material. The controlled release or delayed release composition may be produced without substantial expansion of the matrix material to thereby avoid production of a low density product which prematurely or too rapidly releases the encapsulant or the embedded component.

Copending U.S. application Ser. No. 09/233,443, filed Jan. 20, 1999 in the name of Bernhard H. Van Lengerich, International Publication No. WO 00/21504 published on Apr. 20, 2000, U.S. Pat. No. 6,500,463 to Van Lengerich, and International Publication No. WO 01/25414 published on Apr. 12, 2001, the disclosures of which are herein incorporated by reference in their entireties, disclose a continuous process for producing shelf-stable, controlled release, discrete, solid particles from a liquid encapsulant component which contains a sensitive encapsulant, such as a heat sensitive or readily oxidizable pharmaceutically, biologically, or nutritionally active component, such as essential and/or highly unsaturated fatty acids. A liquid encapsulant component which contains an active, sensitive encapsulant, such as a live microorganism or an enzyme dissolved or dispersed in a liquid plasticizer is admixed with a plasticizable matrix material. The matrix material is plasticizable by the liquid plasticizer and the encapsulation of the active encapsulant is accomplished at a low temperature and under low shear conditions. The active component is encapsulated and/or embedded in the plasticizable matrix component or material in a continuous process to produce discrete, solid particles. The encapsulants may be suspensions of microorganisms in water, and suspensions or dispersions or emulsions or solutions of vitamins, enzymes, minerals or trace elements in water or other liquids. The liquid content of the liquid encapsulant component provides substantially all or completely all of the liquid plasticizer needed to plasticize the matrix component to obtain a formable, extrudable, cuttable, mixture or dough. Removal of liquid plasticizer prior to extrusion is not needed to adjust the viscosity of the mixture for formability.

U.S. Pat. No. 5,064,669 to Tan et al relates to the production of controlled release flavors for microwaveable foods. Controlled-release, flowable flavoring powders are produced by: a) heating a high-melting-point encapsulating or enrobing material (fat and/or wax and one or more emulsifiers) to melt the starting material; b) mixing one or more water-containing flavor compositions with a texture conditioning agent; c) mixing the flavor compositions and texture containing agent with the molten fat or wax to obtain a homogeneous mixture in the form of an emulsion; and d) chilling the flavor composition-containing mixture to provide discrete particles of solid encapsulated flavoring agent.

U.S. Pat. No. 5,106,639 to Lee et al discloses a process for preparing fatty fodder additives by mixing an emulsifier, a carrier, and a fat material containing omega-3 fatty acids to produce an emulsion, homogenizing the emulsion, and drying the emulsion to produce a powdered fat. The emulsion may also contain water and whey. The carrier may be soybean protein, skim milk solids, starch, pectin, gelatin, casein, collagen, and egg protein. After spray drying or fluidized bed drying, the particulate fat product generally has a particle size ranging from about 0.1 to about 1.0 millimeters. An enteric coating comprising a cellulosic material may be applied to the powdered fat.

U.S. Patent Application Publication No. US 2004/0017017 A1, published Jan. 29, 2004 to Van Lengerich et al, the disclosure of which is herein incorporated by reference in its entirety, discloses production of a stabilized oil-in-water emulsion which contains a readily oxidizable component or a heat sensitive component. An antioxidant for prevention of oxidation of the active, sensitive encapsulant, and a film-softening component or plasticizer for the film-forming component may be included in the emulsion. The emulsion is stabilized by subjecting it to homogenization. Shelf stable, controlled release, discrete, solid particles or pellets which contain an encapsulated and/or embedded readily oxidizable component or a heat sensitive component are produced by first reducing the water content of the stabilized emulsion. Reduction of the water content causes the film-forming component to form a film around the oil droplets and encapsulate the encapsulant. The water content of the homogenized emulsion may be reduced by spray-drying to produce a powder. In other embodiments, after homogenization, the water content of the emulsion may be reduced by admixing the emulsion with at least one matrix material to thereby encapsulate the film-coated oil droplets within the matrix material. After the water content of the emulsion is reduced, a protective coating is applied on the film-coated oil droplets to obtain pellets. The protective coating helps to prevent diffusion of the oil component to the surface of the pellets, and helps to inhibit penetration of atmospheric oxygen into the encapsulated oil component. The protective coating also fills in or seals any crevices, cracks, irregularities, or pores in the underlying substrate and helps to provide a more smooth surfaced, uniform pellet or cluster. After application of the protective coating, the pellets may be dried to obtain the final encapsulated product.

Inclusion of an antioxidant in the oil phase or oil droplets generally makes it mobile for interacting with any ambient oxygen invading the encapsulated readily oxidizable component. However, addition of an antioxidant to the emulsion may result in an increase in emulsion viscosity due to interaction with certain proteins and could impede the attainment of small oil droplet sizes. Also, it would also be beneficial to include an antioxidant in the matrix material so as to help prevent the oxygen from even reaching the readily oxidizable component in the oil droplets. However, when incorporating an acidic antioxidant into the matrix material, it has been found that upon drying the pellets to a shelf stable water activity, the acidic antioxidant tends to crystallize and become immobilized. Immobilization of the acidic antioxidant inhibits its interaction with invading ambient oxygen.

The present invention provides a process for producing discrete, particulate, shelf-stable encapsulated sensitive components, such as heat-sensitive components or readily oxidizable components, such as omega-3 fatty acids. Exposure of the sensitive components to atmospheric oxygen may be substantially prevented without the need for a protective surface coating on the particulates. The process avoids the need to incorporate substantial amounts of antioxidants in the oil component which tend to react with certain proteinaceous film-forming components or which tend to increase viscosity of the emulsion which may impede homogenization and result in reduced encapsulation efficiency. In accordance with the present invention, an acidic antioxidant may be incorporated in a matrix material without loss of mobility for interaction with any invading ambient oxygen. The processes of the present invention may be used for the continuous production of an edible composition for delivering pharmaceutically or nutritionally active components, such as omega-3 fatty acids. The particulates containing encapsulated fish oils, and food products containing the particulates do not exhibit rancid odors or tastes for extended periods of time, for example for at least about six months.

SUMMARY OF THE INVENTION

A readily oxidizable component, such as a polyunsaturated fatty acid, is encapsulated by forming an oil-in-water emulsion with a film-forming component, such as a protein, for coating oil droplets of the oil phase. The readily oxidizable component is present in the oil phase and is protected from oxidation by a film formed from the film-forming component. The oil-in-water emulsion is admixed with at least one matrix material, a liquid plasticizer such as glycerol, for plasticizing the matrix material, and an acidic antioxidant for preventing oxidation of the readily oxidizable component. The acidic antioxidant is solubilized in the liquid plasticizer. Separation of the acidic antioxidant from a protein film-forming component, such as a caseinate, during emulsion formation and homogenization, avoids possible deleterious interaction between the protein and the acidic antioxidant.

A formable mixture or dough is obtained where the at least one matrix material contains the acidic antioxidant and encapsulates film-coated oil droplets of the oil-in water emulsion. The dough is formed into pieces or pellets which may be dried to a shelf stable water activity of less than or equal to about 0.7.

The plasticizer provides mobility for the acidic antioxidant within the matrix material in the dried pieces so that the antioxidant can react with any ambient oxygen entering the pieces before the oxygen can reach and react with the readily oxidizable component. The acidic antioxidant neutralizes and helps in the prevention of malodorous basic compounds, such as amines of fish oil, from escaping out of the pellets.

DETAILED DESCRIPTION OF THE INVENTION

A stabilized emulsion is employed to produce shelf stable, controlled release, discrete, solid particles or pellets which contain an encapsulated and/or embedded component, such as a readily oxidizable component containing a polyunsaturated fatty acid. An oil encapsulant component which contains an active, sensitive encapsulant dissolved and/or dispersed in an oil is admixed with an aqueous component and a film-forming component to form an emulsion. The emulsion is stabilized by subjecting it to homogenization. The stabilized emulsion is admixed with at least one plasticizable matrix material and a plasticizer for plasticizing the at least one matrix material to encapsulate oil droplets which are coated with the film forming component. An acidic antioxidant for prevention of oxidation of the active, sensitive encapsulant is dispersed throughout the at least one matrix material. The plasticizer provides mobility to the antioxidant throughout the plasticized matrix material. The acidic antioxidant neutralizes and helps to prevent escape of malodorous basic compounds, such as amines from the pellets.

Exemplary acidic antioxidants or proton-donating antioxidants which may be employed in effective amounts in the matrix material are organic acids such as L-cysteine, acetic acid, tartaric acid, lactic acid, malic acid, citric acid, fumaric acid, propionic acid, tannic acid, ascorbic acid, and erythorbic acid, tocopherol, catechin, salts thereof and mixtures thereof. Exemplary salts which may be employed are alkaline earth metal and alkali metal salts, such as calcium, potassium, and sodium salts of ascorbic acid, erythorbic acid, and L-cysteine, and phenolic salts. The preferred acidic antioxidants for use in the matrix material are organic acids such as citric acid, ascorbic acid and erythorbic acid, most preferably erythorbic acid.

The amount of the acidic antioxidant employed in the matrix material may be from about 1% by weight to about 40% by weight, preferably from about 10% by weight to about 30% by weight, most preferably from about 15% by weight to about 25% by weight, based upon the weight of the oil component. In embodiments of the invention, the amount of acidic antioxidant may be up to about 18% by weight, for example from about 0.5% by weight to about 6% by weight, based upon the weight of the pellet.

The plasticizer for dispersing and mobilizing the acidic antioxidant throughout the matrix material may be any liquid which solubilizes the acidic antioxidant and is retained in the pellet after drying in a sufficient amount to soften the pellet, prevent substantial crystallization of the acidic antioxidant, and provide mobility to the acidic antioxidant in the dried pellet. The mobility provided should be such so that the acidic antioxidant can react with any ambient oxygen which enters the pellet interior or matrix material to prevent the oxygen from penetrating into the film-coated oil droplets. Also, the plasticizer should keep the acid antioxidant solubilized and prevent substantial crystallization in the dried pellet. The mobility should enable the acidic antioxidant to donate protons to satisfy any peroxides from the fatty acids or react with any malodorous amines given off by fish oils. Exemplary of mobilizing plasticizers which may be employed with the acidic antioxidant are polyols or glycols such as glycerol, propylene glycol, and polyethylene glycol, sugar alcohols such as sorbitol, monosaccharides, and di-saccharides such as fructose, and dextrose, and mixtures thereof. Glycerol is the preferred mobilizing plasticizer or softener for admixing with the acidic antioxidant.

While water may be employed to plasticize the matrix material as well as to solubilize the acidic antioxidant, drying of the pellets to achieve a shelf stable water activity of less than about 0.7 generally results in substantial crystallization and immobilization of the acidic antioxidant in the pellet. Accordingly, water or aqueous solutions which enable forming a dough, such as fruit juice, may be employed as a plasticizer in the matrix to facilitate mixing and initial dispersing and homogenization of the antioxidant. However, a less volatile, liquid plasticizer or softener such as a polyol should also be employed to achieve shelf stability and acidic antioxidant mobility in the final pellet. Water or aqueous solutions employed as a plasticizer for the matrix material may be admixed with the non-aqueous plasticizer or softener or it may be separately added to the matrix material. Water which is used to form the oil-in-water emulsion also serves to plasticize the matrix material.

The amount of the non-aqueous mobilizing plasticizer or softener, such as glycerol, should be sufficient to solubilize the antioxidant. Exemplary amounts of the non-aqueous mobilizing plasticizer or softener may range from about 1% by weight to about 25% by weight, preferably from about 10% by weight to about 20% by weight, based upon the weight of the pellet.

The pellets are produced by first reducing the water content of the stabilized emulsion so that the film-forming component forms a film around the oil droplets and encapsulates the encapsulant. After homogenization, the water content of the emulsion may be reduced by admixing the emulsion with at least one matrix material to thereby encapsulate the film-coated oil droplets within the matrix material.

Preparation of the Stabilized Oil-in-Water Emulsion

Improved dispersion and encapsulation of active, sensitive encapsulant materials in discrete shelf-stable particles is obtained by pre-emulsification of the encapsulant. The encapsulant is incorporated into or forms the oil phase of an oil-in-water emulsion. The oil-in-water emulsion containing the encapsulant is admixed with at least one matrix material, such as a plasticizable matrix material, to encapsulate the encapsulant within the matrix material. Matrix materials which are plasticizable by the emulsion or the aqueous component of the emulsion, results in encapsulation of the encapsulant within a plasticized matrix material. The encapsulant or sensitive, active component may be a solid or liquid. Solid encapsulants are dispersed in an oil prior to emulsification with water or an aqueous liquid. If the encapsulant itself is an oil, it may be directly emulsified with the water or aqueous liquid.

In embodiments of the present invention, the aqueous component, such as water or an acidic aqueous solution, such as a 0.2N acetic acid in water, may be admixed with the film-forming component, such as a protein, to obtain an aqueous solution. The film-forming component helps to stabilize the emulsion, retain oil droplet size, inhibit diffusion of the oil component and encapsulant to the particulate or pellet surface, and to inhibit contact of rancidity-causing oxygen with the oil component.

The aqueous solution, such as an aqueous protein solution, may have a film-forming component content, or protein content, of from about 1% by weight to about 50% by weight, preferably from about 5% by weight to about 25% by weight, most preferably from about 8% by weight to about 15% by weight, based upon the total weight of the aqueous component, such as water, and the film-forming component, such as protein.

In preferred embodiments of the invention, the film-forming component is water soluble and comprises a hydrophobic or oleophilic portion, such as a film-forming protein, so that it concentrates in the aqueous phase at the oil and water interface. Film-forming components which may be employed include proteins, hydrocolloids such as alginates and carrageenans, starch derivatives, and mixtures thereof. Proteins are the preferred film-forming components for use in the emulsification. Exemplary proteins which may be employed are one or more vegetable proteins, dairy proteins, animal proteins, or protein concentrates, such as proteins stemming from milk, whey, corn, wheat, soy, or other vegetable or animal sources. Preferred proteins for use in the present invention are dairy proteins such as caseinates and whey protein isolates, and wheat protein isolates, such as gluten. Caseinates, such as sodium caseinate, potassium caseinate, calcium caseinate, and ammonium caseinate are most preferred proteins for use in the present invention.

The caseinates are readily soluble proteins, and provide lower viscosity aqueous phases compared to viscosities obtained with other proteins, such as whey protein isolates. The lower viscosity facilitates emulsification and homogenization with the oil phase, and the attainment of small oil droplet sizes, and unexpectedly superior microencapsulation efficiency.

Microencapsulation efficiency (ME) may be calculated as follows:

$$ME=[(\text{Total oil}-\text{Free oil})/\text{Total oil}]\times 100[\%]$$

The quantitative determination of the total oil content of the samples may be accomplished by acid hydrolysis followed by extraction according to the WEIBULL-STOLDT method. The free, accessible or non-encapsulated oil in the extrusion pellets may be determined according to a modified method after SANKARIKUTTY et al., "Studies on Microencapsulation of Cardamom Oil by Spray Drying Technique", *Journal of Food Science and Technology*, vol. 6, pp. 352-356 (1988), HEINZELMANN et al., "Microencapsulation of Fish Oil by Freeze-drying Techniques and Influence of Process Parameters on Oxidative Stability During Storage", *European Food Research and Technology*, vol. 211, pp. 234-239 (2000), McNAMEE et al., "Emulsification and Microencapsulation Properties of Gum Arabic", *Journal of Agricultural and Food Chemistry*, vol. 46, pp. 4551-4555 (1998), McNAMEE et al., "Effect of Partial Replacement of Gum Arabic with Carbohydrates on its Microencapsulation Properties", *Journal of Agricultural and Food Chemistry*, vol. 49, pp. 3385-3388 (2001), and HOGAN et al., "Microencapsulation Properties of Sodium Caseinate", *Journal of Agricultural and Food Chemistry*, vol. 49, pp. 1934-1938 (2001). A sample with a total oil content of approximately 1 g (e.g. 7 g of extrusion pellets with an oil content of approximately 15%) may be transferred in 100 ml petroleum ether (boiling point: 60-80° C.) and stirred with a magnetic stirrer for exactly 15 minutes at ambient temperature. After the following filtration (Schleicher & Schuell 595) the filtrate may be transferred into an extraction apparatus after SOXHLETT and the solvent may be evaporated at 80° C. The received oil residue may be dried in a drying oven (Heraeus 6060, Kendro Laboratory Products, Hanau, Germany) at 105° C. to constant (or minimum) weight and quantified gravimetrically (approximately 1 hour). Under the conditions of the pre-described method the free oil is completely removed from the pellets already after 15 minutes. An increase of the agitation time up to 60 minutes did not entail significant changes. Compared with other solvents, i.e., alcohols, ethers, water and/or mixtures thereof, the use of petroleum ether results in the highest content of free oil. In embodiments of the present invention, the microencapsulation efficiency may be greater than about 85%, preferably greater than about 90%.

The protein may be at least substantially or completely hydrated and denatured prior to admixing with the oil component to avoid clumping and to facilitate subsequent pumping through the homogenizer. Hydration can be accomplished by preparing the solution the day before use and storing it under refrigerated conditions overnight to permit any foam or froth resulting from the mixing to settle.

The protein, such as whey protein isolate (WPI), can be kept in either the native form or can be denatured prior to emulsification with the fish oil. Denaturation can be achieved by heating the dispersed WPI solution to about 80° C.-90° C. and holding for 30 minutes. Denatured WPI solutions appear to form better films than native WPI solutions and may add to the stability of the final encapsulated fish oil. In either case, the whey protein isolate can serve as an emulsifier in the final emulsion with fish oil. Again, it is desirable to allow the WPI solutions (native or denatured) to fully hydrate and cool under refrigerated conditions, for example at about 40° F., prior to use.

In embodiments of the present invention, the emulsion may be made by admixing one or more optional ingredients with the aqueous film-forming component solution, such as the aqueous protein solution, using a high shear mixer such as an ULTRA-TURRAX ROTOSOLVER high shear mixer or other mixer with adequate shear. Such optional ingredients include a film-softening component or plasticizer, a non-acidic antioxidant, an acidic antioxidant, a flavor, and an emulsifier in amounts which do not adversely affect viscosity for emulsification and homogenization and the achievement of small oil droplet sizes and a stable emulsion. When a readily oxidizable encapsulant such as omega-3 fatty acids is to be encapsulated, mixing of the optional ingredients with the emulsion is preferably conducted in an atmosphere which is at least substantially free of oxygen, such as under a nitrogen blanket or inert gas blanket. Preferably to prevent and/or minimize oxygen exposure, a nitrogen blanket can be applied in subsequent locations when the fish oil is directly exposed to the atmosphere.

A film-softening component or plasticizer for reducing brittleness and preventing cracking of the film formed from the film-forming component which may be optionally added in the emulsion step include monosaccharides and disaccharides, such as sucrose and fructose, and polyols such as glycerol, and polyethylene glycol. The amount of the film-softening component or plasticizer may be from about 1% by weight to about 75% by weight, preferably from about 15% by weight to about 50% by weight, based upon the weight of the film-forming component.

For the encapsulation of readily oxidizable components such as omega-3 fatty acids, the emulsion is preferably prepared in an atmosphere substantially free of oxygen, such as a nitrogen blanket, and a non-acidic antioxidant or an acidic antioxidant may optionally be added in the emulsion step to the aqueous phase or to the oil phase. Exemplary anti-oxidants which may be employed are L-cysteine and its salts, ascorbic acid and salts thereof, erythorbic acid and salts thereof, tocopherol, catechin, TBHQ, phenolics, natural antioxidants such as grape seed extract which contain antioxidant phenolics, and nut fibers, such as almond fiber, and mixtures thereof. TBHQ may or may not be present in the oil employed as a raw material, but even if present, may be added additionally in the oil prior to emulsification. For example, TBHQ may be added to the oil in an amount of about 10 ppm to about 1200 ppm, more preferably from about 600 ppm to about 1000 ppm, based upon the weight of the oil component. Mixed tocopherols may be added to the oil at concentrations of from about 10 ppm to about 1000 ppm. In embodiments of the invention, the amount of the optional antioxidant employed in the emulsion step may range from about 10 ppm by weight to about 10,000 ppm by weight, for example from about 50 ppm by weight to about 1,000 ppm by weight, or about 100 ppm by weight, based upon the weight of the oil component.

An acidic antioxidant, a non-acidic antioxidant or a film softening component or plasticizer may optionally be employed in the emulsion. The optional antioxidant employed in the emulsion may be the same or different from the antioxidant employed in the matrix. In embodiments of the invention, it is preferable to only employ an acidic antioxidant and a plasticizer for mobilization of the acidic antioxidant in the matrix material. The mobilizing plasticizer and the acidic antioxidant in the matrix material serves to prevent oxidation of the oxidizable component in the film-coated oil droplets. Also, the mobilized plasticizer migrates to the film forming component and helps to reduce its brittleness. Moreover, reducing the viscosity of the aqueous phase by inclusion of an acidic antioxidant and a plasticizer for mobilization of the acidic antioxidant only in the matrix material and not in the preparation of the emulsion has been found to facilitate the formation of a highly stable homogeneous oil-in-water emulsion having very small oil droplet sizes.

Also, in preferred embodiments, separation of the acidic antioxidant from the protein during emulsion formation and homogenization, avoids possible deleterious interaction between the protein and the acidic antioxidant. For example, it has been found that when a caseinate is employed as the preferred film forming component, the inclusion of an acidic antioxidant in the emulsion preparation tends to thicken or gel the aqueous solution of the protein which impedes emulsification with the oil phase and the production of small oil droplet sizes. It is believed that the acidic antioxidant may lower the pH of the aqueous phase so as to precipitate the caseinate, such as sodium caseinate. However, when the caseinate is in the emulsion, and the acidic antioxidant and the mobilizing plasticizer are added to the matrix material rather than in the aqueous phase in the emulsion formation step, a highly stabilized oil-in-water emulsion is obtained where substantially all of the protein-coated oil droplets may have diameters of less than about 1 micron.

A preferred flavor which may optionally be added to the oil phase to mask off-flavors and off-odors in the oil and to help chemically stabilize oil are vanilla and vanillin. The flavor may be added at a level ranging from about 1% by weight to about 25% by weight, for example from about 10% by weight to about 15% by weight, preferably from about 2% by weight to about 5% by weight, based upon the weight of the oil phase.

The oil phase and the aqueous phase components may be admixed in the high shear mixer, such as an ULTRA-TURRAX ROTOSOLVER for about 10 minutes prior to high pressure multi-stage homogenization.

Once all of the ingredients for making the emulsion are admixed, the resulting emulsion or combination of ingredients may be run through a homogenizer. The homogenizer total stage pressure may be from about 1 psig to about 30,000 psig, generally at least about 2,000 psig, preferably from about 4,000 psig to about 10,000 psig, most preferably from about 5,000 psig to about 7,000 psig. The homogenization may be performed in one or more stages, using one or more passes through each stage. For example, two stages and three passes may be employed for the homogenization step. In other embodiments, there may be as many as four discrete passes of the emulsion through the homogenizer, but more preferably there are two to three passes. This process can produce a stable emulsion with droplet sizes less than about 2.1 microns (90 percentile), preferably less than about 1 micron (90 percentile). It is preferable to minimize heat exposure during homogenization as much as possible and to keep a nitrogen blanket on all emulsion containers.

Pre-emulsifying of an encapsulant oil or an encapsulant-in-oil into water or an aqueous liquid plasticizer may be achieved using a multi-step high pressure homogenizer either alone or in combination with a colloid mill to obtain minimum droplet size. High pressure homogenization gives rise to small droplet sizes and may substantially improve the distribution and dispersion, and bioavailability of active, sensitive encapsulants within a matrix material. Encapsulation of the emulsion within a matrix material can then be carried out under controlled, low pressure and low temperature conditions to prevent coalescence, oil separation, and extruder surging while giving a soft formable mixture or dough comprising small droplets of an active, sensitive encapsulant dispersed throughout the dough or mixture. The dough or mixture may be cut or shaped and dried to yield substantially non-expanded, discrete shelf-stable particles or pellets exhibiting an improved release profile of active encapsulant materials. An encapsulant may optionally be included in the water phase of the emulsion. An emulsifier may optionally be included to facilitate production or stabilization of the emulsion.

In high-pressure homogenization an oil encapsulant or encapsulant in-oil is mixed with water or an aqueous fluid to obtain small oil droplets. All, or at least substantially all, for example, at least about 90% of the oil droplets in the homogenized, stabilized emulsion and in the discrete particulates, pellets, or encapsulated products of the present invention may have oil droplet sizes of less than about 50 microns in diameter, preferably less than about 10 microns in diameter, more preferably less than about 2 microns in diameter, most preferably less than about 1 micron in diameter. In embodiments of the invention, the oil droplet diameters may be greater than about 0.5 mm. The smaller the droplets, the more stable is the emulsion which allows the formation of a dough without substantial coalescence of the droplets and oil separation. Also, reduced coalescence and very fine dispersion may increase bioavailability of the encapsulant. Reduction in coalescence increases coating or encapsulation of the encapsulant by a continuous phase of plasticized matrix material, for example plasticized semolina or mixtures of semolina and native starch. Use of a film-forming component, which can also function like an emulsifier, for example a vegetable or animal protein or protein concentrate can stabilize the emulsion by forming a thin film around the oil droplets during emulsification processing. Non-film forming emulsifiers, monoglycerides, diglycerides, or triglycerides or mixtures thereof, or other molecules that are characterized as having a lipophilic and a hydrophilic part may be employed to enhance stabilization of an oil encapsulant inside an outer aqueous phase. The smaller, substantially non-coalesced droplets, do not protrude from the matrix material, thereby reducing surface exposure of the oil coated encapsulant to air.

Encapsulants can either comprise an active oil component, or can comprise a solid active, sensitive encapsulant component dispersed in oil. Readily oxidizable oil encapsulants may comprise, for example, castor oil, algae-based oil or oil derived from algae, flax oil or flax seed oil, fish oil, or any other oil containing polyunsaturated fatty acids (PUFA) such as omega-3 fatty acids, such as eicosapentaenoic acid (EPA), docosahexaenoic acid (DHA), docosapentaenoic acid, and linolenic acid, omega-6 fatty acids, fat soluble vitamins such as vitamins A, D, E, and K, gamma linoleic acid, cod liver oil, flavorants, flavor oils, fragrances, active-ingredient containing extracts, e.g. chlorophyll or herbals, agricultural and pharmaceutical and other bioactive components soluble in oil, and mixtures thereof. In embodiments of the invention, the readily oxidizable oil encapsulant may be any oil derived from any vegetable, animal, marine life, or microorganism which contains a substantial amount, for example at least 5% by weight of a readily oxidizable component. Examples of oils which may contain a substantial amount of a readily oxidizable component are oils derived from soybeans and corn, sunflower oil, rapeseed oil, walnut oil, wheat germ oil, canola oil, krill oil, oil derived from yeast, black currant seed oil, sea buckthorn oil, cranberry seed oil, and grape seed oil. Purified fish oils may, for example, have an omega-3 fatty acid content (DHA, EPA) of from about 25% by weight to about 49% by weight. Flax oil may have an omega-3 fatty acid content as high as about 71% by weight.

Solid encapsulants may include solid forms of pharmaceutical compositions or compounds, nutraceutical compositions or compounds, nutritional components, biologically active components, flavorants or flavorant compositions, fragrances or fragrance compositions, detergents, pharmaceutically or nutritionally acceptable salts thereof and mixtures thereof.

Oil may serve to provide a protective coating on the encapsulant and may be used to control the rate of release of the encapsulant. Oil, including an encapsulant as oil, may be included in an amount of from about 1% by weight to about 49% by weight, preferably from about 10% by weight to about 45% by weight, most preferably from about 25% by weight to about 40% by weight, based upon the weight of the emulsion, or total weight of the oil component and aqueous component. Edible oils, shortenings or fats which may be employed include those derived from plant, animal, and marine sources, as well as edible fat substitutes, and mixtures thereof. Exemplary of vegetable oils which may be employed are corn oil, safflower oil, soybean oil and cottonseed oil, which may be hydrogenated, and mixtures thereof.

The oil-in-water emulsions according to the present invention may optionally include an emulsifier in effective emulsifying amounts to aid in the stabilization of the emulsion. Conventional emulsifiers used in food and pharmaceutical products, such as mono-glycerides and di-glycerides, may be selected for use according to the present invention.

Reduction of Water Content of the Emulsion by Admixing with a Matrix Material

After homogenization, the water content of the emulsion is reduced so that the film-forming component forms a film around the oil droplets and encapsulates the encapsulant. The water content of the emulsion may be reduced by admixing the emulsion with at least one matrix material to thereby encapsulate the film-coated oil droplets within the matrix material. The aqueous component, such as water, is adsorbed by or interacts with the matrix material to thereby increase the concentration of the film-forming component and to cause it to form a film and precipitate around the oil droplets. Thus, if microcapsules of the oil component and the film-forming component are obtained, the microcapsules are further encapsulated by the matrix component. Preferably, the matrix material comprises a plasticizable matrix material, such as durum wheat flour, which is plasticized by the aqueous component to thereby encapsulate the film-coated oil droplets within the plasticized matrix material. Admixing of the emulsion and the matrix material may be performed in an extruder to form a dough.

In preferred embodiments, all or substantially all of the plasticizer may be the water or aqueous liquid contained in the oil-in-water emulsion encapsulant component and the mobilizing plasticizer used to dissolve the acidic antioxidant. Additional, separately added plasticizer for the matrix material, such as water, fruit juice or other aqueous plasticizers may be added to the matrix material to assist in the formation of a dough or to adjust its viscosity for formability. The formable mixture or dough of the present invention may have a total plasticizer content of from about 18% by weight up to about 60% by weight, preferably about 20% by weight to about 45% by weight of the product or dough of the present invention. When plasticizers are employed at high levels, for example above about 60% by weight, a thin low viscosity dough may result which cannot be cut at a die. However, lower plasticizer contents, such as below about 5% may result in a dry product, which would be too fragile after forming and would fall apart. Low plasticizer contents may also generate frictional heating during extrusion forming and would be detrimental to a heat sensitive encapsulant.

In embodiments of the invention, the total amount of water or the moisture content of the dough, from all sources including water in the emulsion, water in the antioxidant solution, and separately added water), may range up to about 35% by weight, based upon the weight of the dough.

In the method of admixing the oil-in-water encapsulant emulsion component into a plasticizable matrix material of the present invention, droplet size is inversely proportional to stability. Accordingly, desirable droplet sizes in the formable mixture or dough of the present invention may range from about 0.5 microns to about 50 microns in diameter, preferably less than about 10 microns in diameter, more preferably less than about 2 microns, most preferably less than about 1 micron. As evidence of emulsion stability, the droplet diameters of the emulsion of the present invention remain substantially unchanged throughout the admixture of the emulsion with a matrix material to form a dough or formable mixture. This may result from the fact that the water or aqueous liquid that forms the continuous phase of the emulsion acts as a plasticizer for the plasticizable matrix material of the present invention and thereby together with the acid antioxidant plasticizer they become all or substantially all of the liquid in the continuous phase of a dough or formable mixture of the present invention.

According to the present invention, the plasticizable matrix material is plasticized by water or an aqueous liquid and also a non-aqueous plasticizer or softener such as glycerol or propylene glycol. Use of the non-aqueous plasticizer or softener in forming the dough, reduces the amount of water needed for formability and therefor reduces the amount of drying needed for obtaining a shelf-stable water activity. Reducing the amount of drying saves energy and also helps to reduce destruction of heat sensitive components. In embodiments of the invention, the amount of non-aqueous plasticizer or softener such as glycerol or propylene glycol may range up to about 40% by weight, based upon the total amount of plasticizer in the dough or extrudate. After drying, the proportion of water is substantially reduced and the proportion of the non-aqueous plasticizer is increased. For example, after drying, the amount of non-aqueous plasticizer or softener such as glycerol or propylene glycol in the dried pellets may range up to about 75% by weight, based upon the total amount of aqueous and non-aqueous plasticizers in the dried product or pellet.

The preferred plasticizable matrix materials of the present invention are high gluten content flours, gluten from wheat, durum wheat or semolina, dairy proteins, such as sodium caseinate, potassium caseinate, or calcium caseinate, pregelatinized starch, pentosans, hydrocolloids and mixtures thereof. For easier distribution or dispersibility in liquids such as water, finally ground or powdered cookies or crackers or ground cookie-like or cracker-like products may be employed as a matrix material. Other plasticizable matrix materials useful in accordance with the present invention include biopolymers such as carbohydrates, polymers such as polyvinylpyrrolidone, gums and vegetable or dairy proteins. Exemplary starches which may be used in the present invention are modified starches or pregelatinized starches derived from corn, wheat, rice, potato, tapioca, or high amylose starch. Sources of starch which may be used also include flours from grains such as corn, wheat, durum wheat, rice, barley, oat, or rye, and mixtures thereof. The most preferred plasticizable matrix materials according to the present invention include durum wheat flour, semolina, gluten, a dairy protein such as sodium caseinate protein, native starch and mixtures thereof, such as a mixture of durum flour with sodium caseinate or with wheat protein isolate (gluten).

In embodiments of the present invention, the matrix material component may be at least about 30% by weight, for example about 40% by weight to about 95% by weight, preferably from about 45% by weight to about 75% by weight, based on the weight of the final product. The percentage of protein in the matrix material may range from about 5% by weight to about 80% by weight protein, more preferably from about 10% by weight to about 30% by weight. Increasing protein content in the matrix can improve efficiency of encapsulation (i.e. reduce free surface oil).

Durum products or ingredients which may be used in the present invention include durum semolina, durum granular, durum flour and mixtures thereof. Durum semolina is preferred. Durum semolina is the purified or isolated middlings of durum wheat prepared by grinding and bolting cleaned durum wheat to such fineness that when tested by the method prescribed in 21 CFR §137.300(b)(2), it all passes through a No. 20 U.S. sieve, but not more than 3 percent passes through a No. 100 U.S. sieve. The semolina is freed from bran coat or bran coat and germ to such an extent that the percent of ash therein, calculated to a moisture-free basis, is not more than 0.92 percent. The durum granular product is a semolina to which flour has been added so that about 7% passes through the No. 100 U.S. sieve. Durum flour has not less than 98 percent passing through the No. 70 U.S. sieve.

In embodiments of the invention, substantially non-plasticizable matrix components may be used to increase the rate of release of encapsulants from the matrix. Such substantially non-plasticizable matrix materials may comprise substantially non-gelatinized starch in a preferred embodiment, as well as carbohydrates which have a lower molecular weight than starches, bulking agents, fiber or other, inert materials, such as cellulose, fiber or hemi-cellulose. Sources of starch which may be used include flours or starches from grains such as corn, wheat, durum wheat, rice, barley, oat, or rye, and mixtures thereof. In embodiments of the invention, the amount of matrix component which is substantially non-plasticizable is at least about 10% by weight, preferably at least about 25% by weight, and can range up to about 98% by weight, based on the total weight of the at least one plasticizable matrix material and the matrix component which is substantially non-plasticizable. For quickest release rates, the amount of substantially non-plasticizable matrix material, such as non-gelatinized starch, may be at least about 60% by weight, based upon the total weight of the matrix materials.

Additional rate release controlling agents may be added to the admixture of the present invention, including components that may manage, control or affect the flow, diffusion or distribution of water or aqueous-based compositions into and within the final product particles. The additional ingredient or component for controlling the rate of release of the encapsulant may be a hydrophobic agent such as polyethylene, polyurethane, polypropylene, polyvinylchloride, polyvinylacetate, a fat, oil, wax, fatty acid, or emulsifier which increases the hydrophobicity of the matrix. The increased hydrophobicity helps to prevent or delays penetration of water or gastric juice into the matrix. Other ingredients which may be used to control the rate of the release are components which have a high water binding capacity which delay or prevent a fast dissolving of the matrix and thereby delay the release of the encapsulant into the matrix. Exemplary of high water binding capacity components which may be used are proteins, such as wheat gluten, gelatin, casein, and caseinates, such as sodium caseinate, hydrocolloid gums, and the like.

In embodiments of the invention, one or more flavors such as vanilla or vanillin may be added to the matrix material to aid in masking off odors and off flavors. Exemplary amounts of flavor which may be used may range up to about 5% by weight, based upon the weight of the matrix material.

The admixing step of the present invention may be preferably carried out in an extruder to form an admixture of: 1) an oil-in-water encapsulant emulsion component, 2) a dry matrix material component which may include a plasticizable matrix material, an optional non-plasticizable matrix material, an optional rate release controlling agent, and an optional flavor 3) a solubilized acidic antioxidant solution or component which may include an acidic antioxidant, a mobilizing plasticizer or softener such as glycerol, and water, and 4) separately added water. Low extrusion pressures and temperatures are employed to avoid coalescence, oil separation and extruder surging. Generally, to extrude at high pressures, high viscosities are needed to prevent coalescence. However, increasing the viscosity tends to increase shear which can destroy an emulsion.

Low extrusion pressures help to prevent coalescence, prevent the separation of an emulsion and prevent extruder surging. To achieve low pressures, dough viscosity may be reduced by increasing the amount of plasticizer, such as water. However, the dough viscosity should be sufficiently high so as to allow for the attainment of a formable, cuttable mixture at the die. Desirable extruder pressures under which the formable mixture may be formed may range from about 1 bar to about 150 bars, preferably from about 2 bars to about 100 bars, more preferably from about 5 bars to about 50 bars. In embodiments of the invention, die operating pressures may range from about 70 psig to about 800 psig, generally from about 100 psig to about 300 psig.

In making the formable mixture or dough of the present invention, it is preferable in the admixing method of the present invention to achieve a balance between shear, which reduces particle size on the one hand, and lower viscosity, which reduces shear on the other hand. Reducing particle size reduces coalescence and ensures protection of each individual encapsulant droplet within the particles according to the present invention.

In embodiments of the present invention, the pre-emulsified components, followed by the plasticizer/acidic antioxidant solution, and then by optionally added water may be injected into the upstream end of the extruder to achieve plasticization of the plasticizable matrix material without substantial coalescence, or oil separation or surging even at high oil contents. Mixing is continued towards the extruder die while optionally adjusting the product temperature for sufficient formability. The plasticizable matrix material is plasticizable and is plasticized by the water or aqueous liquid, and the mobilizing plasticizer of the plasticizer/acidic antioxidant solution. The optional substantially non-plasticizable matrix component is substantially non-plasticizable and is not plasticized by the liquid plasticizers generally at a temperature of less than about 60° C., preferably less than 50° C., most preferably less than about 45° C., for example at room temperature, or down to about 0° C. Removal of liquid plasticizer prior to extrusion is not needed to adjust the viscosity of the mixture for formability. In embodiments of the invention, the extruder barrel temperatures may be maintained in a range of about −5° C. to about 25° C., preferably from about 5° C. to about 10° C. Generally, die operating temperatures may range from about 10° C. to about 50° C., for example from about 15° C. to about 30° C.

A formable mixture may be obtained without substantially gelatinizing or cooking the plasticizable matrix material or the optional substantially non-plasticizable matrix component. The plasticizable matrix material in the formable mixture may become glassy upon drying, even though it was not cooked or substantially gelatinized during plasticization to obtain the formable mixture. However, use of the non-aqueous mobilizing plasticizer or softener, such as glycerol, may desirably provide a non-brittle, softer or rubbery texture which is less prone to cracking, oil leakage, and ambient oxygen penetration.

The amount of the active component or encapsulant which may be encapsulated or embedded into the matrix may be from about 1% by weight to about 85% by weight, preferably from about 3% by weight to about 50% by weight, and most preferably from about 5% by weight to about 30% by weight, based on the total weight of the plasticizable matrix material of the formable mixture or dough of the present invention.

The admixture or dough may be extruded through extrusion dies and cut or otherwise formed into pieces or pellets with no or substantially no expansion of the extrudate.

In embodiments of the invention, the dough may be extruded through circular die holes having a diameter ranging from 0.1 mm-5 mm (preferably 0.25 mm-2 mm, most preferably 0.5 mm-1 mm) and face cut to 0.1 mm-5 mm (preferably 0.25 mm-2 mm, most preferably 0.5 mm-1 mm). For example, pellet dimensions of ~0.5 mm (ID)×0.5 mm (length) may be produced. The dough may be kept cold during extrusion, for example less than approximately 30° C.

A flow agent such as starch may be added at the cutter apparatus to maintain the discrete nature of the particles or pellets and to assist the air conveying of pellets as they may stick to one another at high extrusion moisture contents or with high matrix protein levels.

The matrix can be composed of one or several different ingredients, ranging from durum wheat flour, sodium or potassium caseinate, whey protein isolate, wheat protein (or protein from other animal or vegetable sources), heat-treated flour, such as heat-treated wheat flour, starch, alginate, to other hydrocolloids, etc. that may provide added oxidation protection.

In embodiments of the invention, the freshly extruded pellets can contain an oil load between about 1-35% by weight (preferably about 5-30% by weight, most preferably about 10-25% by weight), at moisture contents between approximately 15% to 35% by weight.

The extrudate or pieces may then be surface dried using conventional drying equipment, such as a rotary dryer. The pellets can be conveyed to a long (~2 ft ID×4 ft. long) rotating enrober with air blowing countercurrent to extrudate or pellet flow. Dehumidified air is preferred for more efficient drying. Hot air (dehumidified or ambient) up to approximately 280° C. can be used to surface dry the pellets. Generally, the air drying temperature may be from about 37° C. to about 82° C., but more preferred is an air temperature of about 50° C. to about 60° C. Surface drying facilitates optional subsequent coating. Even at elevated hot air temperatures, the product temperature at the exit of the enrober can still remain below approximately 100° F. (~37.7° C.). In embodiments of the invention, up to about 10% by weight moisture or more, for example up to about 20% by weight, may be removed from the pellets during surface drying in the rotary dryer. Other conventional drying apparatus, such as fluid bed drying or static bed drying may also be employed.

In embodiments of the invention, the surface dried extrudate or pellets or pieces may optionally be coated or surface treated with a protective film or coating to either prevent early release or to enable controlled release of the encapsulant from the pellets or pieces. Surface drying after extrusion and before coating facilitates application of a protective coating solution. For instance, drier pellets can accept higher levels of coating before clumping or agglomeration could become an issue. The protective coating may be hydrophilic or oleophobic so as to inhibit outward migration of the oil component to the surface of the pellet where it would be subject to oxidation. Exemplary film-building substances or protective coatings which may be employed are a protein stemming from whey, corn, wheat, soy, or other vegetable or animal sources, such as aquazein (an aqueous corn protein solution), and denatured whey protein isolate solution (with or without a plasticizer such as sucrose or glycerol) a fat, such as melted chocolate fat, shellac, wax, film-forming starch solutions, alginates, an enteric coating, and mixtures thereof.

Denatured whey protein isolate films plasticized with sucrose are preferred for its function as an oxygen barrier. Other biopolymers that may be used in lieu of or in addition to denatured whey protein are soy protein isolate, modified food starch, hydroxymethylpropylmethylcellulose, and shellac. Exemplary polymer and plasticizer ratios which may be employed range from about 1:0.25 to about 1:3 parts by weight of polymer to plasticizer. For example, a coating or film composition for application to the surface dried pellets may be produced by heating a solution consisting of deionized water and whey protein to about 90° C. and holding at that temperature for about 30 minutes to denature the protein. The solution may then be cooled and the plasticizer, such as sucrose, may be added at a ratio of 1 part by weight protein to 3 parts sucrose. The formula of the coating solution may be 5% by weight denatured whey protein, 15% by weight sucrose, and 85% by weight de-ionized water.

The film-building substance or protective coating may also contain a flavoring material, and additional components that delay or prevent the access of light, oxygen, and/or water to the matrix. Light barriers such as titanium dioxide, carbon black, edible ink, cocoa, or the like may be employed.

In embodiments of the invention, the coating solution may be applied as a fine mist, atomized by nitrogen and sprayed onto the surface of the pellets in a rotating enrober. Multiple coatings can be applied with intermediate drying in-between coatings. The coating material may constitute from about 1% by weight to about 20% by weight of the final product mass.

Application of the optional protective coating may also be achieved by pan coating the pieces or pellets immediately after extrusion and prior to final drying. Multiple pan coatings can be applied with intermediate drying in-between coating layers. Fluid bed coating, coating with a rotating enrober drum can also be an option for coating the pieces or pellets, though pan coating may prove more efficient and cost effective.

In an alternate, optional coating method, the surface dried pieces or pellets may be coated with a protective film or coating, such as a functional protein coating, to produce clusters or to produce cereal particulates in a single step. The coating solution may be used to bind pellets to each other to form a pellet cluster, or to bind pellets to an already produced cereal particulate, such as a cereal cluster, while coating the pellets in the process. The particulate may then be used as the delivery mechanism in a cereal product. The cluster may also camouflage the pellet, masking its appearance.

The uncoated pellets, coated pellets or cluster particulates, may be dried to their final moisture content in conventional drying equipment such as a static bed tray dryer or a fluid bed (continuous or batch) dryer. Convective drying by air, which may be dehumidified or ambient, nitrogen, or carbon dioxide, may be employed. Exemplary final moisture contents may range from about 2% by weight to about 10% moisture by weight, based upon the weight of the dried pellets, clusters, or particulates. The drying temperature may range from ambient to 100° C., or more preferably ambient to about 65° C. The pellets, clusters, or particulates may be dried to achieve shelf stable water activity of less than or equal to about 0.7 and a storage stability or shelf life of at least about six months, preferably at least about twelve months, most preferably at least about thirty-six months. In embodiments of the invention the shelf stable water activity may be less than or equal to about 0.9 in a moist product where an optional antimycotic or antimicrobial agent may be employed.

In embodiments of the invention, the final encapsulated readily oxidizable component such as fish oil or flax oil, can contain up to about 45% by weight, for example from about 1% by weight to about 40% by weight, preferably from about 10% by weight to about 30% by weight oil or other readily oxidizable component.

The products of the present invention may possess a chewy or rubbery, non-brittle, non-glassy texture or a crispy texture which is not hard or dense. The products of the present invention may be in the form of discrete particles, pellets, clusters, or tablets. They may be spherical in shape, curvilinear or lens-shaped, flat discs, oval shaped, or the like. In embodiments of the invention, the diameter of the particles may range up to about 7 mm, for example from about 0.3 mm to about 7 mm and the length-to-diameter ratio (l/d) ratio may be from about 0.1 to about 10, for example about 0.5 to about 2, preferably about 1. In some embodiments of the invention, the diameter of the particles may be from about 0.15 mm to about 4 mm, preferably from about 0.20 mm to about 1.0 mm or about 200 microns to about 1000 microns. The particles are generally uniform in size, may be chewy or partially glassy, and granular to increase palatability to humans and animals in a substantially compact form that is easy to swallow with or without chewing. The products of the invention are non-expanded, generally not leavenable, and may exhibit a non-puffed, substantially non-cellular structure. The starch component of the matrices may be substantially ungelatinized or partially gelatinized, and not substantially destructurized or dextrinized. Exemplary specific densities of the products of the present invention are between about 800 g/liter and about 1500 g/liter (about 0.8 to about 1.5 g/cm$^3$).

The encapsulated products of the present invention may be incorporated without grinding into foods intended for human or animal consumption such as baked goods, for example, bread, wafers, cookies, crackers, pretzels, pizza, and rolls, ready-to-eat breakfast cereals, hot cereals, pasta products, snacks such as fruit snacks, salty snacks, grain-based snacks, and microwave popcorn, dairy products such as yoghurt, cheese, and ice cream, sweet goods such as hard candy, soft candy, and chocolate, beverages, animal feed, pet foods such as dog food and cat food, aqua-culture foods such as fish food and shrimp feed, and special purpose foods such as baby food, infant formulas, hospital food, medical food, sports food, performance food or nutritional bars, or fortified foods, food preblends or mixes for home or food service use, such as preblends for soups or gravy, dessert mixes, dinner mixes, baking mixes such as bread mixes, and cake mixes, and baking flour.

In preferred embodiments, the active encapsulant is a fish oil containing omega-3 fatty acids, or a flax oil. The encapsulated product may be redispersed as a liquid, or as a solid for human food, animal feed, or pharmaceutical purposes. The products of the present invention may be used as or incorporated into foods for special purposes, such as performance foods, mood foods, medical foods, nutritional snacks or supplements, sport foods such as power bars, baby foods, toddler foods, infant foods, or foods for pharmaceutical purposes or other dietetic purposes. The discrete particulates or granules of the present invention may be used as a topping for breakfast cereals, snacks, soups, salad, cakes, cookies, crackers, puddings, desserts or ice cream. They may also be used as a granular ingredient for yogurts, desserts, puddings, custards, ice cream or other pasty or creamy foods. Regularly sized pieces may be individually packaged or used as nutritional snacks or, for example added to or formed into nutritional food in bar form.

The present invention is further illustrated by the following non-limiting examples where all parts, percentages, proportions, and ratios are by weight, and all temperatures are in ° C. unless otherwise indicated:

EXAMPLE 1

The ingredients and their relative amounts which may be used to encapsulate a fish oil using a sodium caseinate emulsion and an erythorbic acid antioxidant solution are:

| Dry Matrix Material Component | | | |
|---|---|---|---|
| Ingredient | Amount, grams | Weight % | Volatiles (moisture) (wt %) |
| Durum Flour | 128 | 80 | 10 |
| Wheat protein | 32 | 20 | 10 |
| TOTAL | 160 | 100 | |

The dry feed or dry matrix material component may be prepared by blending the durum flour and the wheat protein to obtain a substantially homogeneous dry blend. The composition of the dry matrix material component may be about 72% by weight durum flour, about 18% by weight wheat protein, and about 10% by weight water.

| Emulsion, Aqueous Phase | | | |
|---|---|---|---|
| Ingredient | Amount, grams | Weight % | Volatiles (moisture) (wt %) |
| Deionized Water | 6030 | 90 | 100 |
| Sodium Caseinate | 670 | 10 | 5 |
| TOTAL | 6700 | 100 | |

The water and sodium caseinate may be admixed to form an aqueous solution. The aqueous solution may then be hydrated overnight under refrigerated conditions at about 40° F.

| Emulsion, Oil Phase | | | |
|---|---|---|---|
| Ingredient | Amount, grams | Weight % | Volatiles (moisture) (wt %) |
| Fish Oil, Marinol C-38 | 3510.3 | 97.3 | 0 |
| Vanilla Flavor | 97.4 | 2.7 | 1 |
| TOTAL | 3607.7 | 100.0 | |

In order to make an emulsion, the fish oil and vanilla flavor may be preblended and added to the aqueous solution under a nitrogen blanket and using a high shear mixer such as a ULTRA-TURRAX ROTOSOLVER mixed at high shear for about 5 minutes. The resulting emulsion may have a composition of about 58.8 wt. % water, 34.1 wt % fish oil, 6.2 wt. % sodium caseinate, 0.9 wt. % vanilla.

The emulsion may be homogenized in an APV multistage homogenizer having a total stage pressure of approximately 5801 psi (400 bar) for two discrete passes. During homogenization, a nitrogen blanket may be kept on all emulsion containers.

| Plasticizer/Acidic Antioxidant Solution | | | |
|---|---|---|---|
| Ingredient | Amount, grams | Weight % | Volatiles (moisture) (wt %) |
| Glycerol | 3749.9 | 74.7 | 0.0 |
| Erythorbic Acid | 768.1 | 15.3 | 1.5 |
| Deionized Water | 502.0 | 10.0 | 100.0 |
| TOTAL | 5020.0 | 100.0 | |

The acidic antioxidant erythorbic acid may be dissolved in a mixture of the glycerol mobilizing plasticizer and deionized water to obtain a plasticizer/acidic antioxidant solution using conventional mixing equipment.

The dry matrix material component, homogenized emulsion, erythorbic acid solution, and additional water for dough viscosity adjustment may be combined in an extruder to obtain a formable dough. The extruder may be a seven barrel Buhler 44 twin screw extruder having a L/D ratio of 40 and eight die inserts having 0.5 mm inner diameter die holes. The extruder may be blanketed with nitrogen gas to avoid oxidation.

The dry feed to the extruder functions as an encapsulating matrix for the emulsion and thus form a dough. The dry feed may be fed to the first barrel at a rate of about 160 g/min. The homogenized emulsion may then serve as a liquid feed to the second barrel of the extruder at an emulsion feed rate of about 114 g/min. The dry feed or matrix materials are admixed and conveyed in the extruder to plasticize the matrix materials and obtain a mass having about 42% by weight durum flour, about 10.5% by weight wheat protein, about 30.3% by weight water, about 2.6% by weight sodium caseinate, about 14.2% by weight oil, and about 0.4% by weight flavor.

Next, the plasticizer/acid solution may be fed to the third barrel of the extruder at a feed rate of about 52 g/m to give a composition having about 35.3% by weight durum flour, about 8.8% by weight wheat protein, about 27.1% by weight water, about 2.2% by weight sodium caseinate, about 11.9% by weight oil, about 0.3% by weight flavor, about 11.9% by weight glycerol, and about 2.4% by weight erythorbic acid.

The additional water may then be added in the third barrel at a rate of about 7.0 g/min and the ingredients may be mixed and conveyed to obtain an extrudable dough having about 34.6% by weight durum flour, about 8.6% by weight wheat protein, about 28.6% by weight water, about 2.1% by weight sodium caseinate, about 11.7% by weight oil, about 0.3% by weight flavor, about 11.7% by weight glycerol, and about 2.4% by weight erythorbic acid.

The dough may be extruded at a screw speed of approximately 80 rpm to form 0.5 mm long pellets. The pellets may comprise approximately 34.6% by weight durum flour, about 8.6% by weight wheat protein, about 28.6% by weight water, about 2.1% by weight sodium caseinate, about 11.7% by weight oil, about 0.3% by weight flavor, about 11.7% by weight glycerol, and about 2.4% by weight erythorbic acid.

The pellets may then be surface dried in a long (2 ft.×4 ft.) rotating enrober and subjected to final drying in a fluid bed dryer to evaporate about 74.7 g/min of moisture, and produce about 258.3 g/min of dry pellets. The dry pellets may contain about 44.6% by weight durum flour, about 11.2% by weight wheat protein, about 8.0% by weight water, about 2.7% by weight sodium caseinate, about 15.0% by weight oil, about 0.4% by weight flavor, about 15.0% by weight glycerol, and about 3.0% by weight erythorbic acid.

We claim:

1. An encapsulated product comprising
   a) oil droplets comprising at least one polyunsaturated fatty acid,
   b) a film-forming component comprising a protein, said film-forming component coating said oil droplets,
   c) at least one matrix material encapsulating the film-coated oil droplets,
   d) an acidic antioxidant dispersed throughout said matrix material, and
   e) a liquid plasticizer which plasticizes said at least one matrix material and which provides mobility to said acidic antioxidant in the plasticized matrix material,
   wherein said film forming component surrounds said oil droplets, and said matrix material and said acidic antioxidant surround the film-coated oil droplets, so that the acidic antioxidant can react with any ambient oxygen which enters the pellet interior or matrix material to prevent the oxygen from penetrating into the film-coated oil droplets.

2. An encapsulated product as claimed in claim 1 wherein said oil droplets comprise fish oil or flax seed oil.

3. An encapsulated product as claimed in claim 2 wherein said acidic antioxidant comprises at least one member selected from the group consisting of citric acid, ascorbic acid, erythorbic acid and salts thereof, and said liquid plasticizer comprises at least one polyol.

4. An encapsulated product as claimed in claim 3 wherein said at least one polyol comprises at least one member selected from the group consisting of glycerol, propylene glycol, and sorbitol, and said film forming component comprises at least one caseinate.

5. A food product for animal or human consumption comprising an encapsulated product as claimed in claim 1.

6. A food product as claimed in claim 5 which is selected from the group consisting of baked goods, ready-to-eat breakfast cereals, hot cereals, pasta products, fruit snacks, salty snacks, grain-based snacks, microwave popcorn, yoghurt, cheese, and ice cream, hard candy, soft candy, and chocolate, beverages, animal feed, pet foods, aqua-culture foods, baby food, infant formulas, hospital food, medical food, sports food, performance food or nutritional bars, or fortified foods, preblends for soups or gravy, dessert mixes, dinner mixes, cookie mixes, bread mixes, cake mixes, baking flour, and nutrient clusters.

7. An encapsulated product as claimed in claim 1 wherein at least substantially all of the oil droplets have a diameter of less than about 2 microns, said film forming component surrounds said oil droplets, and said matrix material and said acidic antioxidant surround the film-coated oil droplets.

8. An encapsulated product as claimed in claim 1 wherein the amount of said acidic antioxidant is up to about 18% by weight, based upon the weight of the encapsulated product.

9. An encapsulated product as claimed in claim 1 wherein the acidic antioxidant comprises erythorbic acid and salts thereof.

10. An encapsulated product as claimed in claim 1 wherein said matrix material comprises durum wheat flour or protein derived from wheat.

11. An encapsulated product as claimed in claim 2 wherein the amount of the acidic antioxidant in the matrix material is from about 10% by weight to about 30% by weight, based upon the weight of the oil.

12. An encapsulated product as claimed in claim 1 wherein said plasticizer comprises at least one member selected from the group consisting of glycerol, propylene glycol, and sorbitol, and the amount of said plasticizer is from about 10% by weight to about 20% by weight, based upon the weight of the encapsulated product.

13. An encapsulated product as claimed in claim 1 wherein the microencapsulation efficiency is greater than about 85%.

14. An encapsulated product as claimed in claim 1 wherein the amount of the matrix material is at least about 30% by weight, based on the weight of the encapsulated product.

15. An encapsulated product as claimed in claim 1 wherein the amount of the acidic antioxidant employed in the matrix material is from about 1% by weight to about 40% by weight, based upon the weight of the oil.

16. An encapsulated product as claimed in claim 15 wherein the amount of the acidic antioxidant employed in the matrix material is from about 15% by weight to about 25% by weight, based upon the weight of the oil.

17. An encapsulated product as claimed in claim 1 wherein said acidic antioxidant is admixed with said liquid plasticizer to obtain a substantially homogeneous antioxidant solution, and said antioxidant solution is admixed with said matrix material to at least substantially plasticize said matrix material and to substantially uniformly distribute said antioxidant throughout said matrix material.

18. An encapsulated product as claimed in claim 1 wherein the amount of the acidic antioxidant employed in the matrix material is from about 10% by weight to about 30% by weight, based upon the weight of the oil, and said film-forming component comprises a caseinate.

19. An encapsulated product as claimed in claim 1 which is in the form of a pellet wherein the amount of acidic antioxidant employed in the matrix material is from about 0.5% by weight to about 4% by weight, based upon the weight of the pellet.

* * * * *